United States Patent
Van Der Burg et al.

(10) Patent No.: US 10,448,786 B2
(45) Date of Patent: Oct. 22, 2019

(54) APPARATUS FOR PREPARING FOOD HAVING A DRAWER WITH A SLIDING MECHANISM

(71) Applicant: KONINKLIJKE PHILIPS N.V., Eindhoven (NL)

(72) Inventors: Johan Michiel Van Der Burg, Eindhoven (NL); Godwin Dirk Zwanenburg, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 765 days.

(21) Appl. No.: 14/912,663

(22) PCT Filed: Aug. 14, 2014

(86) PCT No.: PCT/IB2014/063906
§ 371 (c)(1),
(2) Date: Feb. 18, 2016

(87) PCT Pub. No.: WO2015/028911
PCT Pub. Date: Mar. 5, 2015

(65) Prior Publication Data
US 2016/0192808 A1 Jul. 7, 2016

(30) Foreign Application Priority Data
Aug. 26, 2013 (CN) .......................... 2013 1 0374660

(51) Int. Cl.
*A47J 37/06* (2006.01)
*A47J 37/04* (2006.01)

(52) U.S. Cl.
CPC ........... *A47J 37/0641* (2013.01); *A47J 37/04* (2013.01); *A47J 37/049* (2013.01)

(58) Field of Classification Search
CPC .................................................. A47B 88/40–44
USPC ....................................... 312/334.27–334.43
See application file for complete search history.

(56) References Cited

U.S. PATENT DOCUMENTS

| | | | | |
|---|---|---|---|---|
| 1,095,363 | A | * | 5/1914 | Weiss ..................... A47B 88/10 312/334.33 |
| 1,694,762 | A | | 12/1928 | Ackerman |
| 3,301,169 | A | | 1/1967 | Young |
| 4,441,773 | A | * | 4/1984 | Leiper .................. A47B 88/487 312/330.1 |
| 6,450,085 | B1 | | 9/2002 | Riesselmann |

(Continued)

FOREIGN PATENT DOCUMENTS

| | | |
|---|---|---|
| CN | 2253941 Y | 5/1997 |
| CN | 202891672 U | 4/2013 |

(Continued)

*Primary Examiner* — Ibrahime A Abraham
*Assistant Examiner* — John J Norton

(57) ABSTRACT

The present invention relates to an apparatus for preparing food, said apparatus comprising: —a shell (1) having internal walls (2), —a drawer (3) placed inside the shell (1), the drawer comprising a pan (4) and a food basket (5), the food basket (5) being placed inside the pan (4), —an air heating system (6) and an air fan (7) placed inside the shell (1), —a sliding mechanism (8) placed between the internal walls (2) and the drawer (3). The sliding mechanism allows to correctly position the drawer inside the apparatus, and reduces efforts of use to manipulate the drawer.

6 Claims, 15 Drawing Sheets

(56) References Cited

U.S. PATENT DOCUMENTS

| | | |
|---|---|---|
| 6,789,861 B1 | 9/2004 | Dobberstein |
| 2006/0081622 A1 | 4/2006 | Cho |
| 2009/0134140 A1* | 5/2009 | Van Der Weij ..... A47J 37/0623 219/400 |
| 2013/0180413 A1 | 7/2013 | Tjerkgaast |

FOREIGN PATENT DOCUMENTS

| | | |
|---|---|---|
| CN | 203041949 U | 7/2013 |
| EP | 0443329 A2 | 8/1991 |
| EP | 2034872 B1 | 3/2009 |
| EP | 2042811 A1 | 4/2009 |
| EP | 2613679 B | 7/2013 |
| FR | 1220280 A | 5/1960 |
| JP | 2004263899 | 9/2004 |
| JP | 2004353960 A | 12/2004 |
| JP | 2010112586 A | 5/2010 |
| JP | 2010133676 A | 6/2010 |
| JP | 2013142497 | 7/2013 |
| WO | 2014154775 A1 | 10/2014 |

* cited by examiner

APPARATUS FOR PREPARING FOOD HAVING A DRAWER WITH A SLIDING MECHANISM

This application is the U.S. National Phase application under 35 U.S.C. § 371 of International Application No. PCT/IB2014/063906, filed on Aug. 14, 2014, which claims the benefit of International Application No. 201310374660.1 filed on Aug. 26, 2013. These applications are hereby incorporated by reference herein.

FIELD OF THE INVENTION

The present invention relates to an apparatus for preparing food, in particular by moving a flow of hot air over food ingredients.

BACKGROUND OF THE INVENTION

An apparatus for preparing food is known from EP2034872B1. Such type of apparatus is used in a domestic environment and provides a solution for heating, cooking, and/or frying food ingredients by circulating a flow of hot air around those food ingredients. Such an apparatus generally comprises an enclosed drawer having a food basket into which food ingredients are placed by user. The drawer can be taken out from the apparatus by user, for example, via a handle fixed to the drawer, so that user can access the inside part of the food basket and put the food ingredients in it. After the drawer loaded with food ingredients is put back inside the apparatus, a flow of hot air is then circulated around the food ingredients in order to heat, cook, and/or fry ingredients.

With such types of known apparatus, it is sometimes difficult to correctly position the drawer inside the apparatus. If the drawer is not correctly positioned, the hot air which is circulated inside the apparatus leaks outside the apparatus, resulting in a lower heating/cooking/frying efficiency. Moreover, if a substantive amount of food ingredients is put by user into the food basket, the weight of the drawer gets significant, resulting in inconveniences for user when manipulating the drawer.

SUMMARY OF THE INVENTION

It is an object of the invention to propose an improved apparatus for preparing food. The invention is defined by the independent claims. The dependent claims define advantageous embodiments.

According to the present invention, there is provided an apparatus comprising:
- a shell having internal walls,
- a drawer placed inside the shell, the drawer comprising a pan and a food basket, the food basket being placed inside the pan,
- an air heating system and an air fan placed inside the shell,
- a sliding mechanism placed between the internal walls and the drawer.

The sliding mechanism allows to correctly position the drawer inside the apparatus. The sealing area between the drawer and the shell is thus minimized, which avoids the leak of hot air circulating inside the apparatus. As a consequence, the heating/cooking/frying efficiency of food ingredients is optimized. Moreover, even if a substantive amount of food ingredients is put by user into the food basket, efforts to manipulate the drawer by user are highly reduced. Also, thanks to the assembly of the food basket inside the pan, the weight to be manipulated is reduced by the fact that the food basket can be taken out without having to take out the pan at the same time. While the pan still can be taken out easily for cleaning without having to disassemble parts.

In a preferred embodiment, the sliding mechanism is placed between the bottom part of the internal walls, and the bottom part of the drawer.

This particular position of the sliding mechanism guaranties an easy and compact mounting of the sliding mechanism inside the apparatus.

In a preferred embodiment, the sliding mechanism is positioned along the longitudinal symmetry axis of the bottom part of the internal walls.

When the shell and its internal walls are round-shaped, positioning the sliding mechanism along the longitudinal symmetry axis allows choosing sliding mechanisms having longer dimension, in order the drawer can be fully taken out from the shell.

In a preferred embodiment, the sliding mechanism comprises a first slider and a second slider positioned parallel to each other.

This feature allows a better stabilization of the drawer when the drawer is pulled-out by the user.

In a preferred embodiment, the sliding mechanism comprises a first slider placed between a first lateral part of the internal walls and the drawer, and a second slider placed between a second lateral part of the internal walls and drawer.

This sliding mechanism allows an easy assembly when the shell and its internal walls are square-shaped, and improves the stability of the drawer when the drawer is pulled-out by the user.

In a preferred embodiment, the first slider and the second slider are ball-bearing sliders.

This sliding mechanism allows a smooth sliding movement of the drawer, even if the weight of the food basket is significant. Moreover, this reduces the wearing effect of the sliding mechanism along the time.

In a preferred embodiment, the first slider and the second slider are roller-mounted sliders.

This sliding mechanism allows a cost-effective solution for a smooth sliding movement of the drawer, even if the weight of the food basket is significant. Moreover, this reduces the wearing effect of the sliding mechanism along the time.

In a preferred embodiment, the first slider and the second slider are two-part sliders.

This type of sliding mechanism is advantageous because it is a cost-effective solution.

In a preferred embodiment, the first slider and the second slider are three-parts sliders.

This type of sliding mechanism is advantageous because it allows the drawer to extend beyond the shell walls, and thus to facilitate the access to the pan and food basket by user.

Detailed explanations and other aspects of the invention will be given below.

BRIEF DESCRIPTION OF THE DRAWINGS

Preferred embodiments of the invention will now be described, by way of example only, with reference to the accompanying drawings, in which.

DETAILED DESCRIPTION OF THE EMBODIMENTS

Figure 1A:
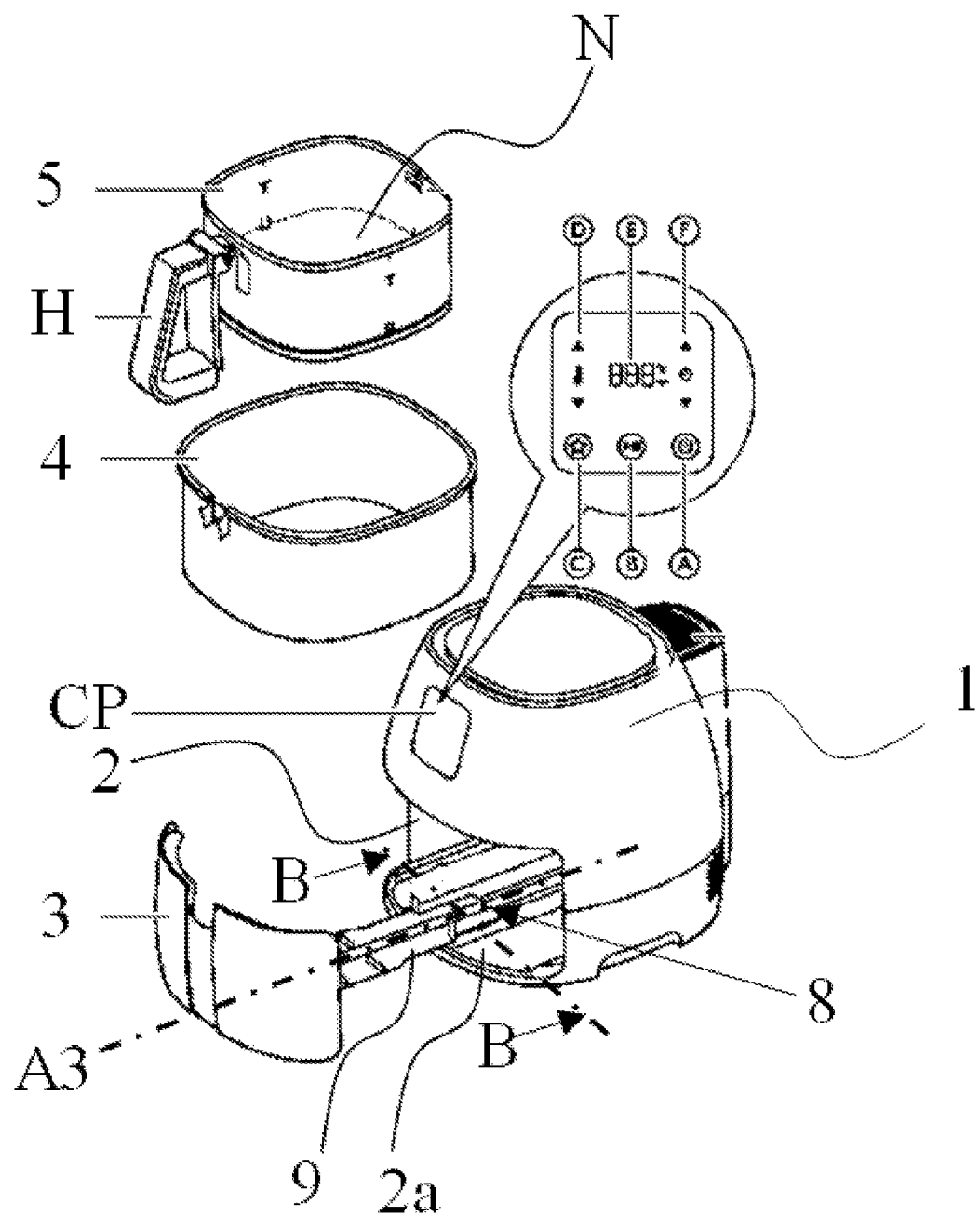
FIG. 1a, FIG. 1b, FIG. 1c, FIG. 2a, FIG. 2b describe various views of an apparatus for preparing food according to the invention.

FIG. 1a, FIG. 1b, FIG. 2a, FIG. 2b describe various views of an apparatus for preparing food according to the invention. This apparatus comprises a shell 1 having internal walls 2. For example, the shell is made of molded-plastic material. The apparatus also comprises a drawer 3 placed inside the shell 1. Advantageously, a handle H is provided attached to the drawer 3 so that user can easily pull-out and pull-in and the drawer. The drawer 3 comprises a pan 4 and a food basket 5. The food basket 5 is placed inside the pan 4. The apparatus also comprises an air heating system 6 and an air fan 7 placed inside the shell 1. For example, the air heating system 6 and the air fan 7 are placed in the upper part inside the shell, and are intended to generate a flow of hot air inside the apparatus. The apparatus also comprises a sliding mechanism 8 placed between the internal walls 2 and the drawer 3.

Figure 1B:
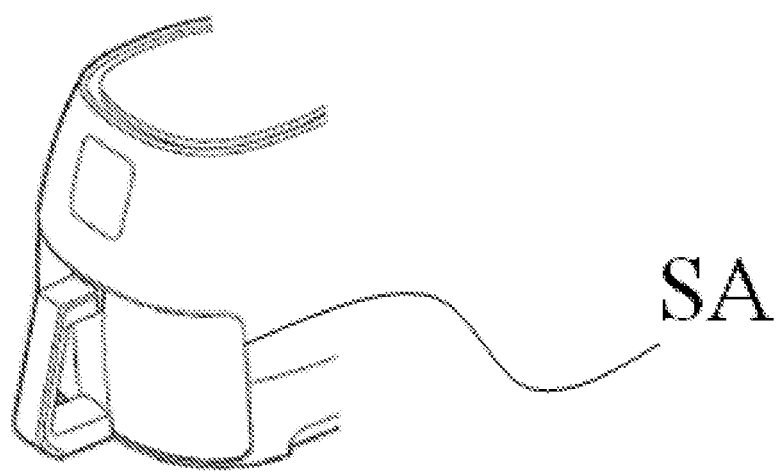

More particularly, FIG. 1b illustrates the apparatus according to the invention after the drawer 3 has been pulled inside the apparatus. This is apparent that the sliding mechanism 8 helps positioning the drawer 3 inside the shell 1, resulting in that the sealing area SA between the drawer and the shell is minimized.

Figure 2A:
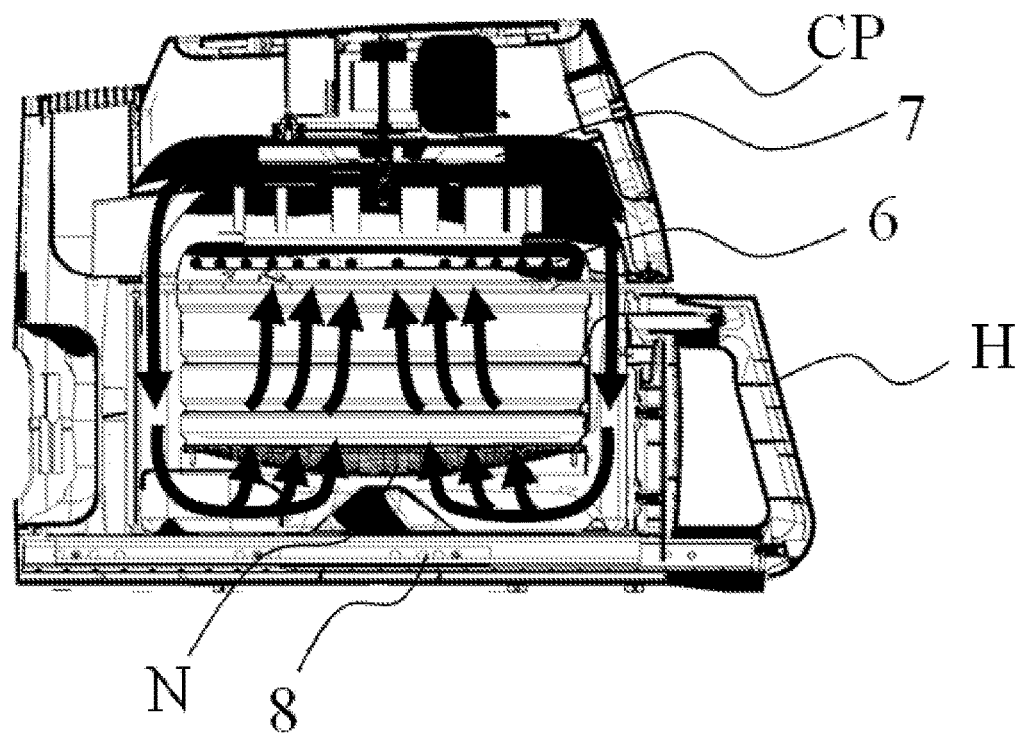
Figure 2B:
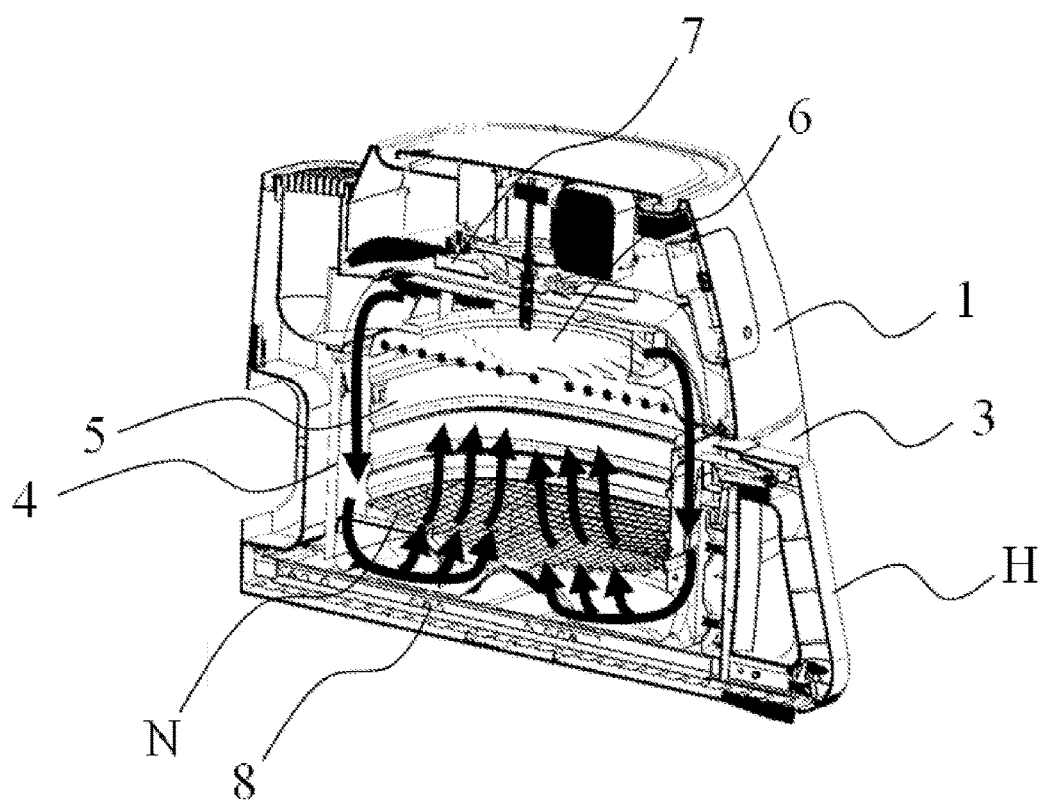

The drawer 3 is advantageously provided with a bottom part 9 that is used to support the pan 4. The heating system 6 advantageously comprises a resistor supplied by electrical voltage. The flow of hot air, illustrated by arrows in FIG. 2a and FIG. 2b, is guided downwards between walls of the pan 4 and walls of the food basket 5, then guided upwards through the air-permeable bottom part of the food basket 5. The permeable bottom part of the food basket 5 is made, for example, of metallic wires forming a net N. Alternatively (not shown), the flow of hot air, or a portion of it, is guided downwards directly in the food basket 5. The hot air which is circulated in the food basket 5 is intended to heat, cook or fry food ingredients that are placed by user in the food basket 5. Additionally, if the heating system 6 is positioned in the upper part above the food basket 5, food ingredients that are placed in the food basket 5 are also heated, cooked or fried via radiation produced by the heating system 6.

Advantageously, the apparatus comprises a control panel CP, for example placed on the front part of the apparatus. The control panel is used to display various parameters of the apparatus on area E, parameters that can be set by user via buttons A, B, C, D, F:

A: power on/off of the apparatus
B: start/stop of the air heating system and the air fan
C: set the temperature and the timer to a preset values
D: increase/decrease temperature of hot air inside apparatus
F: increase/decrease time duration of hot air circulation FIG. 3a, FIG. 3b, FIG. 3c, FIG. 3d illustrate various views of an apparatus according to the invention when used by a user.

Figure 3A:
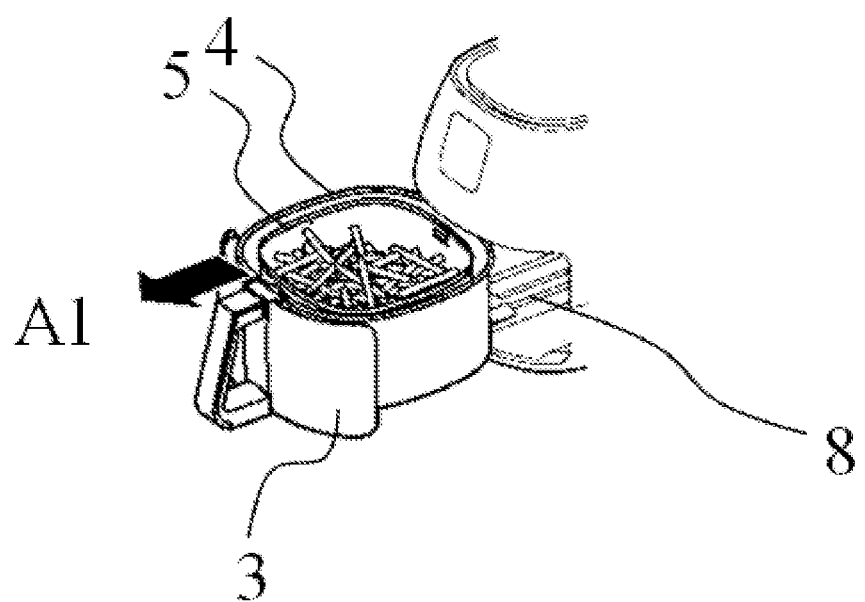
FIG. 3a, FIG. 3b, FIG. 3c, FIG. 3d illustrate various views of an apparatus according to the invention when used by a user.

FIG. 3a illustrates the drawer 3 being pulled-out by user along direction A1. Pulling-out drawer along direction A1 is intended to access the food basket 5, for either loading the food basket 5 with food ingredients, or unloading food ingredients which are already prepared. The sliding mechanism 8 facilitates the manipulation of the drawer 3.

Figure 3B:
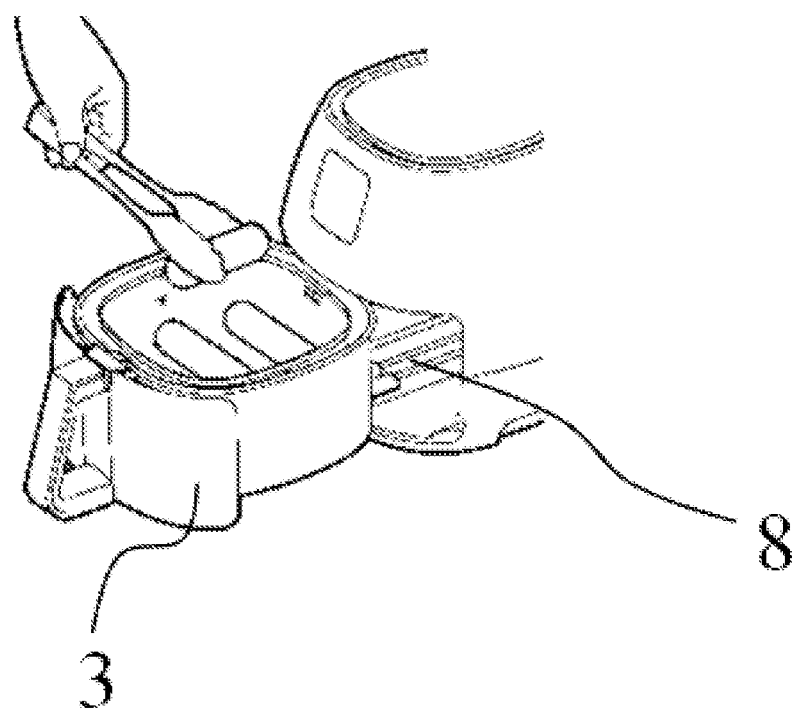

FIG. 3b illustrates the drawer 3 after having been pulled-out by user along direction A1. In this position, user can directly take away the already prepared food ingredients from the food basket 5.

Figure 3C:
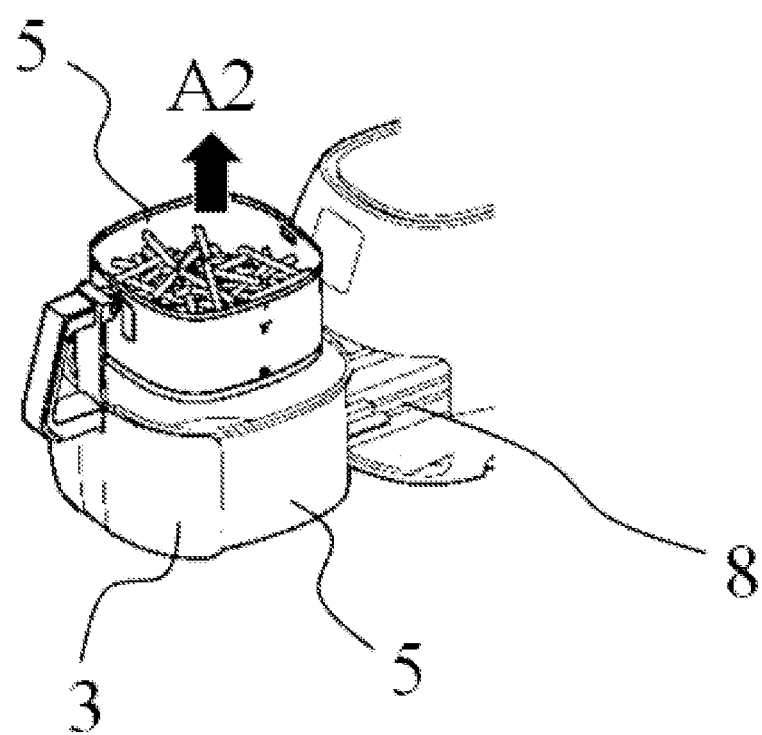
Figure 3D:
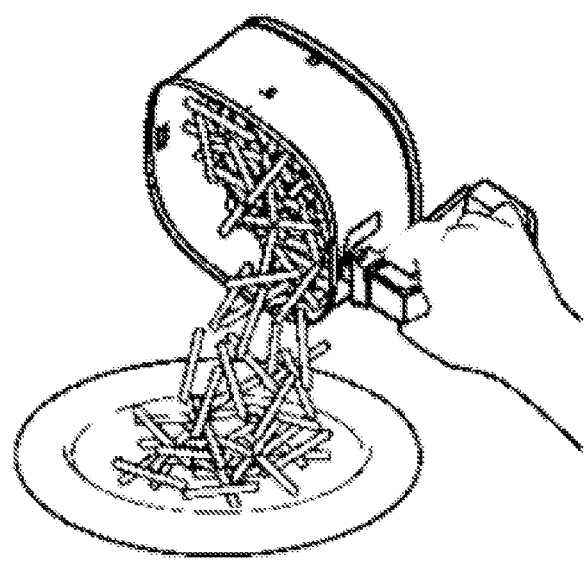

FIG. 3c illustrates the drawer 3 after having been pulled-out by user along direction A1. In this position, user can pull-out the food basket 5 from the pan 4 along direction A2, then pour the food ingredients already prepared in a separate plate, as illustrated in FIG. 3d.

In a preferred embodiment, as illustrated in FIG. 1a, the sliding mechanism 8 is placed between the bottom part 2a of the internal walls 2, and the bottom part 9 of the drawer 3.

In a preferred embodiment, as illustrated in FIG. 1a, the sliding mechanism 8 is positioned along the longitudinal symmetry axis A3 of the bottom part 2a of the internal walls 2. The longitudinal symmetry axis A3 corresponds to the central axis of the bottom part 2a of the internal walls 2.

Figure 1C:
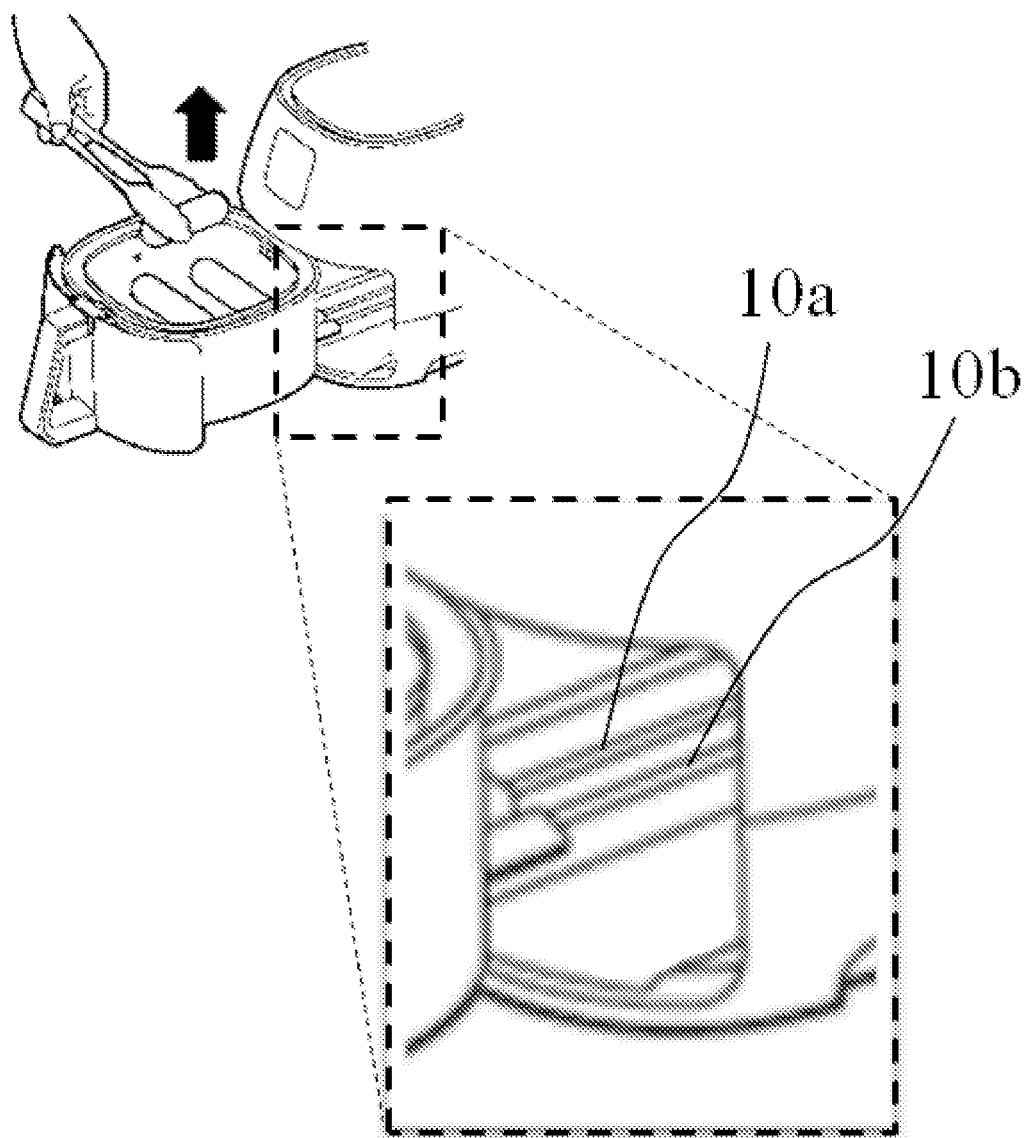

In a preferred embodiment, as illustrated in the zoomed view of FIG. 1c, the sliding mechanism 8 comprises a first slider 10a and a second slider 10b positioned parallel to each other.

Figure 7:
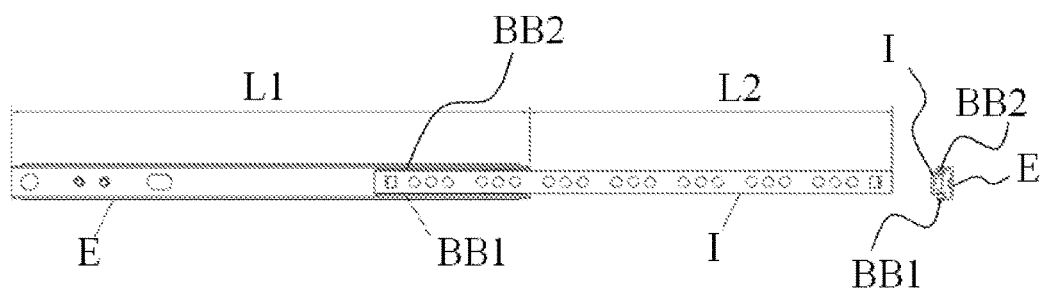
FIG. 7 represents ball-bearing sliders used in an apparatus according to the invention.

The first slider 10a and the second slider 10b advantageously correspond to a type of slider as described along with FIG. 7.

FIG. 7 illustrates a type of slider that can be used in an apparatus according to the invention. The slider comprises an external part E having a length L1 and an internal part I having a length L2. The external part E comprises an area having two opposite linear rows BB1 and BB2 comprising metallic balls and forming linear ball-bearing liaison with the internal part I. The external part E and the internal part I can slide linearly compared to each other. Alternatively, the slider is roller-mounted slider, where metallic rollers are used instead of metallic balls. It is noted that instead of using two-part sliders as illustrated in FIG. 7, three-part sliders (not shown) could also be used, in order to increase the amplitude of linear movement of the drawer when being pulled-out from the shell.

Figure 4A:
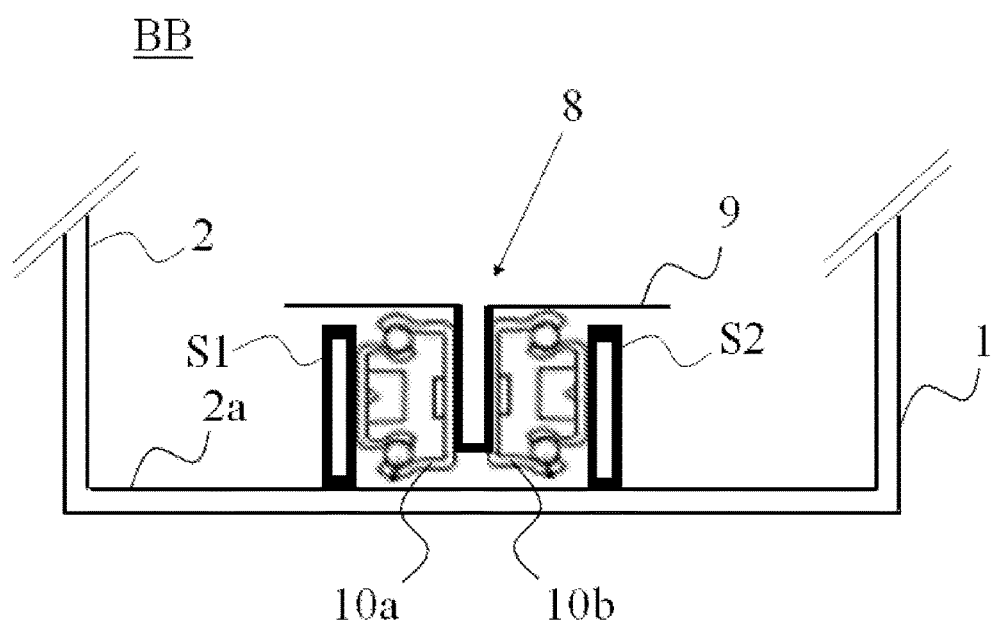
FIG. 4a and FIG. 4b illustrate solutions to mount sliders into an apparatus according to the invention.

FIG. 4a illustrates a solution to mount the first slider 10a and the second slider 10b into an apparatus according to the invention. Preferably, sliders as described along with FIG. 7 can be used. The internal part of the first slider 10a is connected to a first linear support S1 which is fixed to the bottom part 2a of the internal walls 2. The internal part of the second slider 10b is connected to a second linear support S2 which is fixed to the bottom part 2a of the internal walls 2. The external part of the first slider 10a and the external part of the second slider 10b are fixed to the drawer 3 via the bottom part 9. Preferably, as illustrated, the bottom part 9 of the drawer 3 forms a U shape along its central part.

Figure 4B:
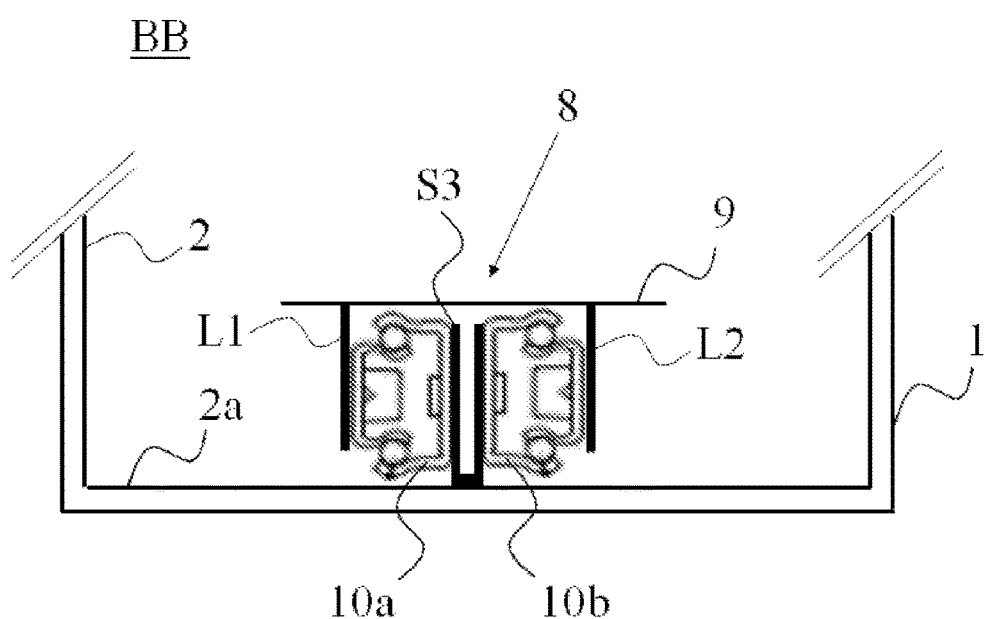

FIG. 4b illustrates a solution to mount the first slider 10a and the second slider 10b into an apparatus according to the invention. Preferably, sliders as described along with FIG. 7 can be used. The internal part of the first slider 10a is connected to a first linear leg L1 extending downwards and fixed to the bottom part 9 of drawer 3. The internal part of the second slider 10b is connected to a second linear leg L2 extending downwards and fixed to the bottom part 9 of drawer 3. The external part of the first slider 10a and the external part of the second slider 10b are fixed to the bottom part 9 of the drawer 3 by the linear support S3, and the linear support S3 is fixed to the bottom part 2a of the internal walls 2.

Figure 5:
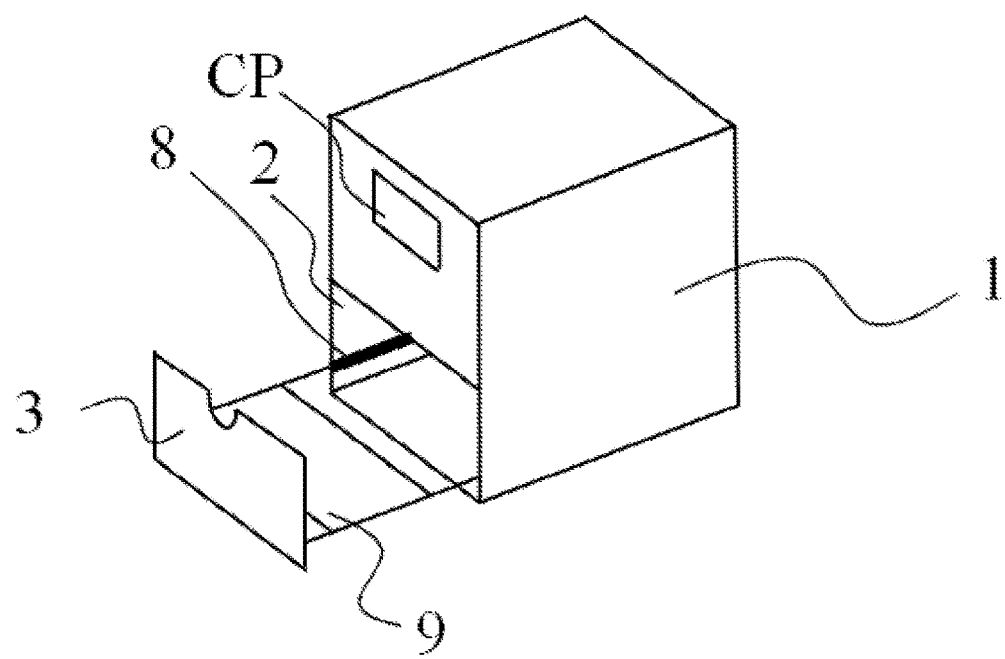
FIG. 5 illustrates an apparatus according to the invention having a shell and internal walls squared-shape.

FIG. 5 illustrates an apparatus according to the invention where the shell 1 and internal walls 2 are squared-shape. In that case, the sliding mechanism 8 is advantageously mounted either on the lateral parts of the internal walls 2, or on the bottom part 2a of the internal walls 2, as further detailed in FIG. 6a and FIG. 6b.

Figure 6A:
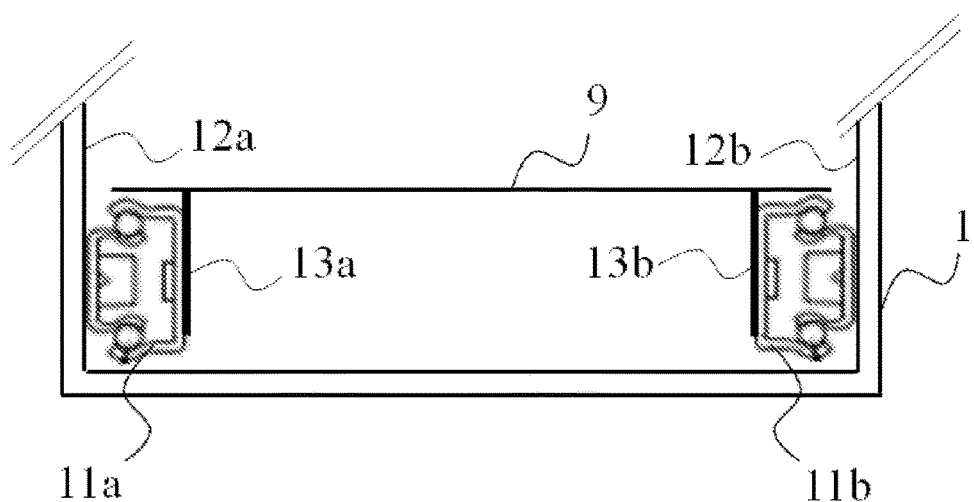
FIG. 6a and FIG. 6b illustrate solutions to mount a sliding mechanism into an apparatus according to the invention.

FIG. 6a illustrates a solution to mount into an apparatus according to the invention, a sliding mechanism 8 comprising a first slider 11a and a second slider 11b. Preferably, sliders as described along with FIG. 7 can be used. The first slider 11a is placed between a first lateral part 12a of the internal walls 2 and the drawer 3. The internal part of the first slider 11a is connected to the first lateral part 12a, and the external part of the first slider 11a is connected to a leg 13a extending downwards from the bottom part 9 of drawer 3. The second slider 11b is placed between a second lateral part 12b of the internal walls 2 and the drawer 3. The internal part of the second slider 11b is connected to the second lateral part 12b, and the external part of the second slider 11b is connected to a leg 13b extending downwards from the bottom part 9 of drawer 3.

Figure 6B:
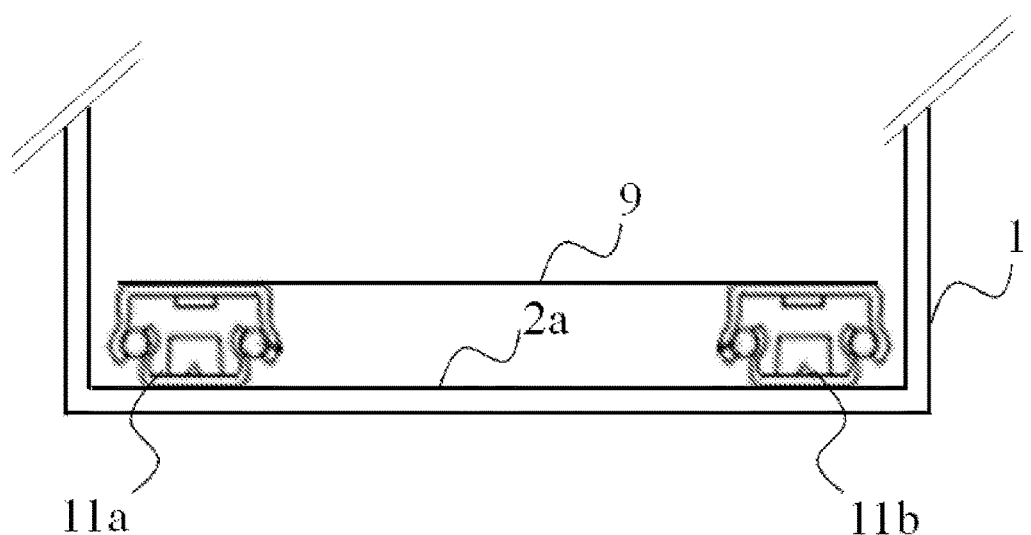

FIG. 6b illustrates an alternative solution of FIG. 6a, where the first slider 11a and the second slider 11b are rotated by an angle of 90° around their longitudinal axis compared to the mounting of FIG. 6a. As a result, the internal parts of sliders 11a and 11b are fixed to the bottom part 2a of the internal walls 2, and the external parts of sliders 11a and 11b are fixed to bottom part 9 of drawer 3.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measures cannot be used to advantage. Any reference signs in the claims should not be construed as limiting the scope thereof.

The invention claimed is:

1. An apparatus for preparing food, the apparatus comprising:
   a shell having internal walls;
   a drawer placed inside the shell,
      wherein the drawer includes a pan and a food basket that is removably placeable inside the pan, and
      wherein the food basket includes a handle detachably attachable to the drawer;
   an air heating system and an air fan placed inside the shell; and
   at least one slider placed between the internal walls and the drawer,
      wherein at least one slider is positioned along a longitudinal symmetry axis of a bottom part of the internal walls.

2. An apparatus as claimed in claim 1, wherein the one slider or each of the at least two sliders is placed between the bottom part of the internal walls, and the bottom part of the drawer.

3. An apparatus as claimed in claim 2, wherein the at least one sider includes a first slider and a second slider positioned parallel to each other.

4. An apparatus as claimed in claim 3, wherein the first slider and the second slider are ball-bearing sliders.

5. An apparatus as claimed in claim 3, wherein the first slider and the second slider are roller-mounted sliders.

6. An apparatus as claimed in claim 3, wherein the first slider and the second slider are two-part sliders.

\* \* \* \* \*